United States Patent [19]

Lee

[11] Patent Number: 5,805,370
[45] Date of Patent: Sep. 8, 1998

[54] HEAD SWITCHING METHOD FOR STAGGERED SERVO AND CIRCUIT THEREOF

[75] Inventor: Kwang-heui Lee, Suwon, Rep. of Korea

[73] Assignee: Samsung Electronics Co., Ltd., Kyungki-do, Rep. of Korea

[21] Appl. No.: 211,526

[22] PCT Filed: Nov. 30, 1992

[86] PCT No.: PCT/KR92/00069

§ 371 Date: Apr. 5, 1994

§ 102(e) Date: Apr. 5, 1994

[87] PCT Pub. No.: WO94/12981

PCT Pub. Date: Jun. 9, 1994

[51] Int. Cl.[6] .................................................. G11B 21/00
[52] U.S. Cl. ................................................. 360/61; 360/75
[58] Field of Search ........................... 360/61, 51, 77.08, 360/78.09, 69, 78.04

[56] References Cited

U.S. PATENT DOCUMENTS 5,444,583  8/1995  Ehrlich et al. .................... 360/78.09
5,473,482  12/1995  Saito et al. ...................... 360/78.09 X
5,475,544  12/1995  Takeuchi ......................... 360/78.04 X

*Primary Examiner*—Aristotelis M. Psitos
*Assistant Examiner*—K. Wong
*Attorney, Agent, or Firm*—Sughrue, Mion, Zinn, Macpeak & Seas, PLLC

[57] ABSTRACT

A head-switching circuit for switching from a first head operating on a first recording medium to a second head operating on a second recording medium so as to read out data written on a recording medium according to a staggered servo mechanism, includes a selector for selecting one of the recording media, a classifier (20, 30, 31, 32, 33 and 34) for classifying the skew time of a recording medium selected by the selector and another recording medium selected by the selector, a sync signal generator (40, 41, 42, 50, 51), (60, 61, 62, 70, 71, 72 and 80) enabled by the output signal of the classifier for generating a sync signal when the skew time to is identical with a predetermined time, thereby generate a sync signal precisely during head-switching in staggered servo mechanism.

2 Claims, 4 Drawing Sheets

HEAD SWITCHING METHOD FOR STAGGERED SERVO AND CIRCUIT THEREOF

FIELD OF THE INVENTION

The present invention relates to a magnetic recording device, and particularly to a head-switching method for a staggered servo and circuit thereof.

DISCUSSION OF RELATED ART

FIG. 1 illustrates a method for writing sector identification codes (sector ID codes) for distinguishing sectors during head-switching in a conventional servo mechanism.

Referring to FIG. 1, in a servo mechanism, when disks are placed in a vertical arrangement, sector ID codes for distinguishing the sectors are vertically aligned with each other. If the sector ID codes are written as shown in FIG. 1, after sector ID codes are completely written on a disk surface, then sector ID codes are written on a next disk surface, so that the writing time takes as much as the rotation number corresponding to the number of disk surfaces, causing the time to be lengthened.

FIG. 2 illustrates a method for writing sector ID codes for distinguishing sectors during head-switching in a conventional staggered servo mechanism.

Referring to FIG. 2, in the conventional staggered servo mechanism, since the sector ID codes are written by skewing according to a skew value, for one rotation, the sector ID codes are completely written on the overall disk surfaces, thereby shortening the recording time. However, in the conventional sector ID code detection method of the staggered servo mechanism, a sector ID code is detected while skipping one or two sectors. In other words, when a head is switched from disk recording surface HD0 to disk recording surface HD1, point A, which is a data area, is forecast as the location of a next sector ID code to repeat the detection operation, so that one or two sector ID codes are skipped or a data read error is created.

SUMMARY OF THE INVENTION

Therefore, it is an object of the present invention to provide a head-switching method which precisely detects a sector ID code written according to a staggered servo mechanism during a head-switching operation.

It is another object of the present invention to provide a head-switching circuit which precisely detects a sector ID code written according to a staggered servo mechanism during a head-switching operation.

To accomplish the first object, there is provided a head-switching method for switching a head operating on one recording medium surface to a head operating on another recording medium surface selected from a plurality of recording medium surfaces so as to read out data written on the selected recording medium surface according to a staggered servo mechanism, the method comprising:

selecting for selecting one of the plurality of recording medium surfaces;

classifying for classifying a skew time between a sector identification code of the recording medium surface selected by the selecting step and a sector identification code of a recording medium surface being selected by a next selecting step; and generating a sync signal when the skew time equals a predetermined time.

To accomplish the second object, there is provided a head-switching circuit for switching a head operating on one recording medium surface to a head operating on another recording medium surface selected from a plurality of recording medium surfaces so as to read out data written on the selected recording medium surface according to a staggered servo mechanism, the circuit comprising:

selecting means for selecting one of the plurality of recording medium surfaces;

classifying means for classifying a skew time between a sector identification code of the recording medium surface currently selected by the selecting means and a sector identification code of a recording medium surface being selected next by the selecting means; and sync signal generating means enabled by an output signal of the classifying means for generating a sync signal when the skew time equals a predetermined time.

BRIEF DESCRIPTION OF DRAWINGS

The above objects and other advantages of the present invention will become more apparent by describing in detail a preferred embodiment thereof with reference to the attached drawings in which.

DETAILED DESCRIPTION OF THE PREFERRED EMBODIMENTS

First, a sector detecting method for use during the head-switching of the present invention will be described below with reference to FIG. 2.

Figure 1:
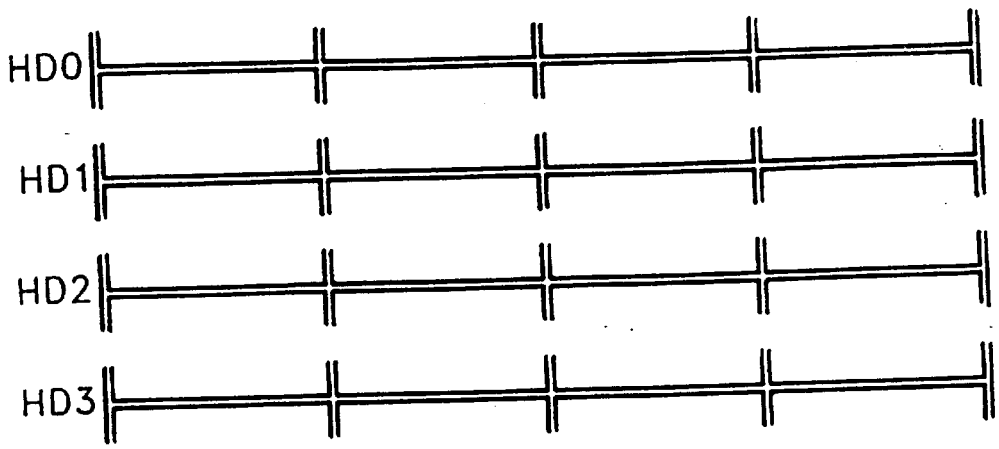
FIG. 1 illustrates a method for writing sector identification codes for distinguishing sectors during head-switching in a conventional aligned servo mechanism.
Figure 2:
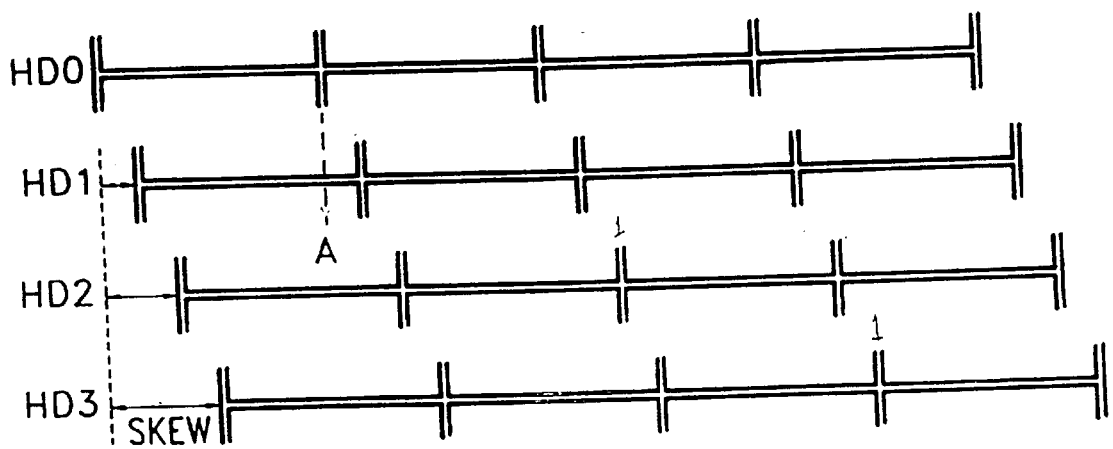
FIG. 2 illustrates a method for writing sector ID codes for distinguishing sectors during head-switching in a general staggered servo mechanism, to which the prior art and the present invention may be equally applied.

In FIG. 2, in compensating for a skew value during head-switching, in order to detect a sector ID code written in one detection operation so as to be skewed as much as the skew value, but without skipping the sector ID code, the sector detecting method for use during head-switching of the present invention compares the location of head operating on a current recording medium surface and the location of head operating on a target recording medium surface and generates a signal so as to forecast a servo identifying location. In the case of a hard disk using two disks, data is written on four disk surfaces. Therefore, in this case, three skew values are created.

Here, to illustrate the head-switching method and apparatus for a staggered servo of the present invention, FIG. 2 is adapted and it is assumed that data is written on the four disk surfaces of the hard disk and the time for writing data on a sector is 260.417 $\mu$s. The skew value is 260.417 $\mu$s/4=65.104 $\mu$s when disk recording surface HD0 is switched to disk recording surface HD1.

The skew values according to head-switching and resultant values which indicate the time required for actual head-switching operation, are calculated as follows.

| current head → next head | skew value | resultant value |
|---|---|---|
| HD0 → HD1 | | |
| HD1 → HD2 | 65.104 μs | 60.604 μs |
| HD2 → HD3 | | |
| HD3 → HD0 | | |
| HD0 → HD2 | | |
| HD1 → HD3 | 130.208 μs | 125.708 μs |
| HD2 → HD0 | | |
| HD3 → HD1 | | |
| HD0 → HD3 | | |
| HD1 → HD0 | 195.312 μs | 190.812 μs |
| HD2 → HD1 | | |
| HD3 → HD2 | | |

A method for calculating the resultant values shown in the above table is explained with reference to FIG. 3.

Figure 3:
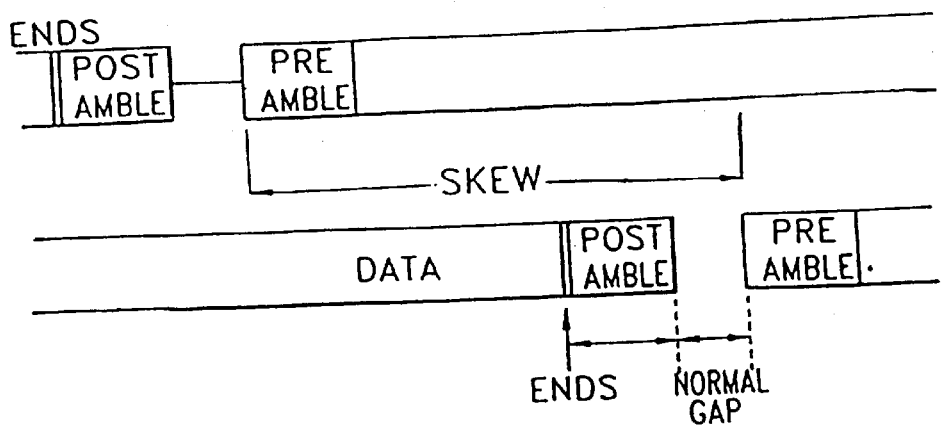
FIG. 3 illustrates a method for, when a head of a current disk surface is switched to a head of another disk surface, finding the location of the sector ID codes on the other disk surface by using a skew value.

Referring to FIG. 3, the resultant values are calculated by the equation of skew value—post amble value—normal gap. Here, the normal gap indicates the distance between a postamble and a preamble. The above table is obtained when the post amble value is 3.375 μs and the normal gap is 1.125 μs.

Figure 4A:
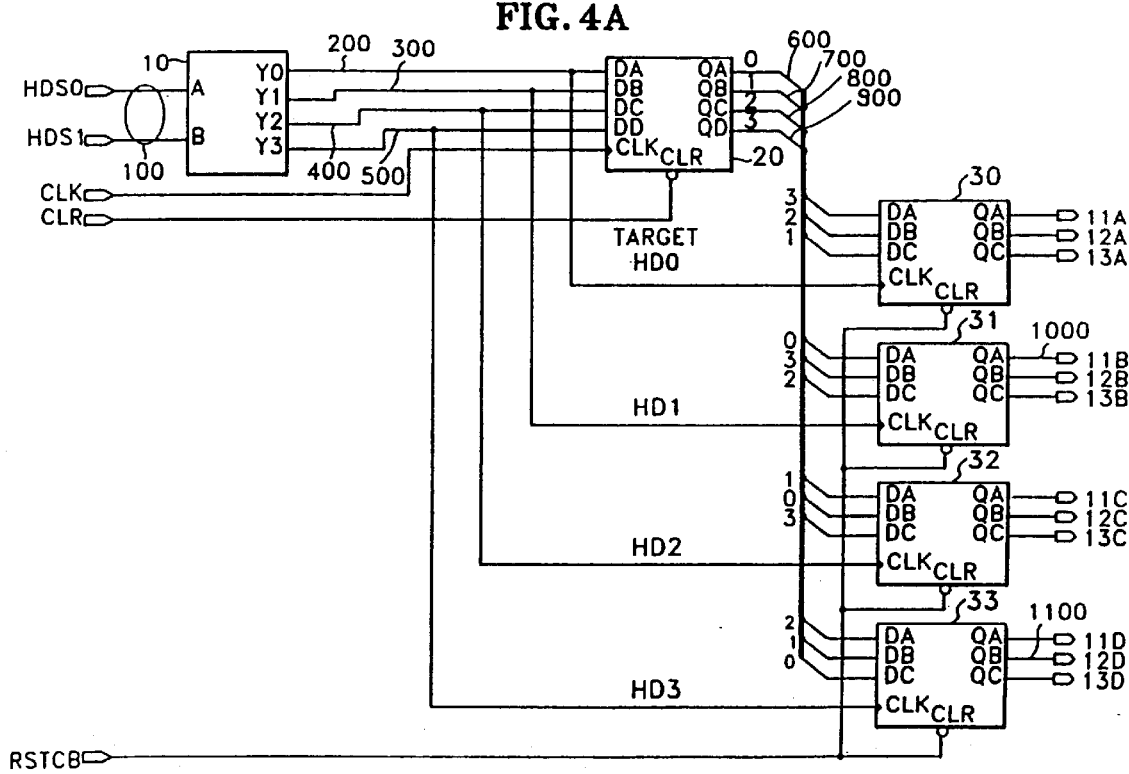
FIG. 4A and 4B cooperatively form a block diagram of a circuit for compensating for a skew value during head-switching, according to the present invention.
Figure 4B:
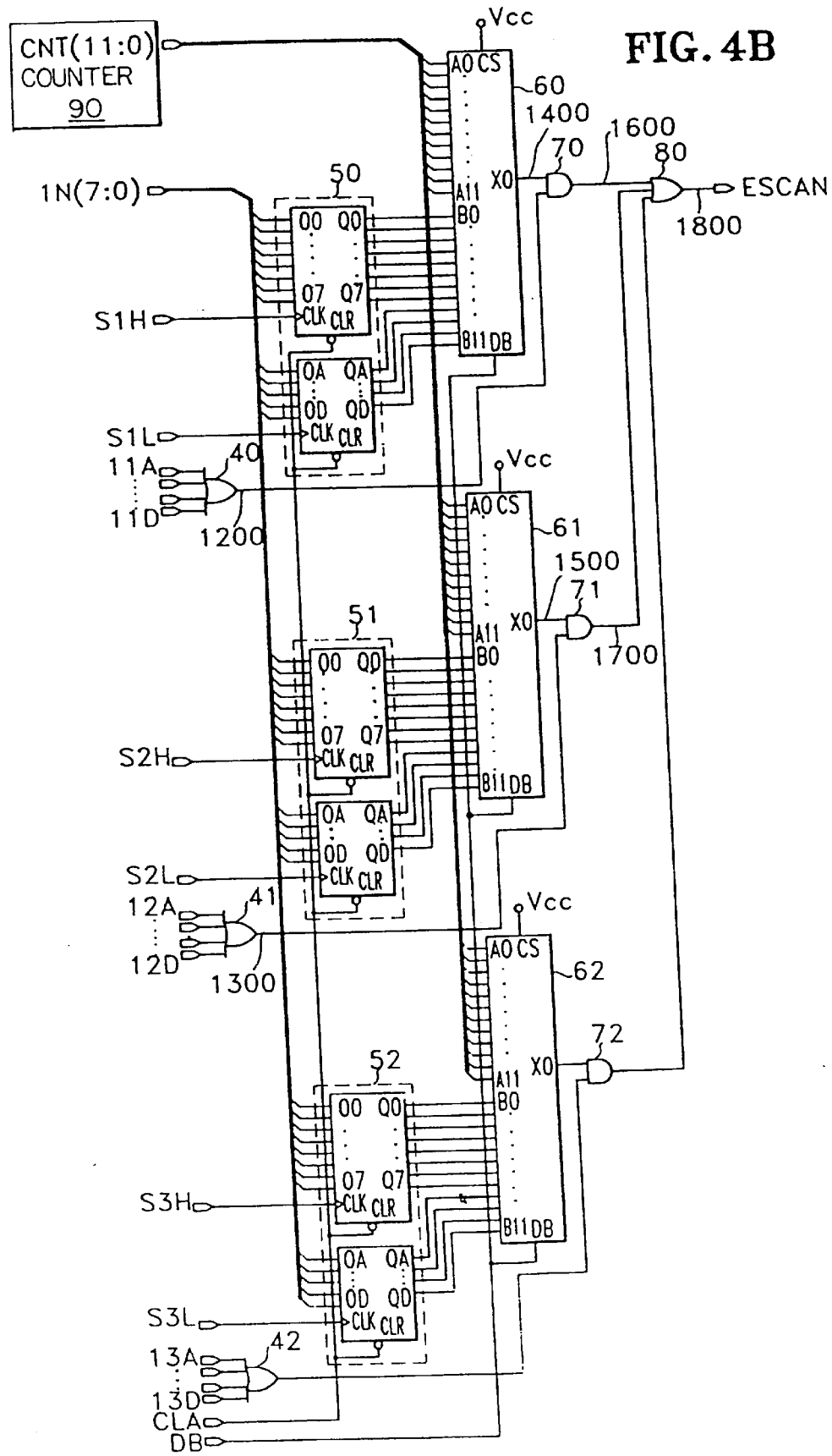

Referring to FIGS. 4A and 4B, two input signals are required in head-switching between the four disk surfaces of the hard disk. A decoder 10 receives two input signals HDS0 and HDS1 to generate signals for selecting disks HD0, HD1, HD2 and HD3. A latch 20 receives and latches the outputs of decoder 10. A latch 30 receives and latches the fourth, third and second outputs of latch 20. A latch 31 receives and latches the first, fourth and third outputs of latch 20. A latch 32 receives and latches the second, first and fourth outputs of latch 20. A latch 33 receives and latches the third, second and first outputs of latch 20. The latches 30, 31, 32, and 33 output latched signals in response to the output signal of the decoder 10.

An OR gate 40 receives and OR-operates the first outputs of latches 30, 31, 32 and 33. An OR gate 41 receives and OR-operates the second outputs of latches 30, 31, 32 and 33. An OR gate 42 receives and OR-operates the third outputs of latches 30, 31, 32 and 33.

A latch 50 stores a first skew value designated by the user. A latch 51 stores a second skew value designated by the user. A latch 52 stores a third skew value designated by the user. A comparator 60 compares a count signal, generated by a counter 90, counted from the start point of the preamble with the output signal of latch 50, to determine whether a match exists. Likewise, a comparator 61 compares the count signal counted from the start point of the preamble with the output signal of latch 51, to determine whether these match. Further, a comparator 62 compares the count signal counted from the start point of the preamble with the output signal of latch 52, to determine whether a match exists here.

An AND gate 70 AND-operates the output signal of comparator 60 and the output signal of OR gate 40. An AND gate 71 AND-operates the output signal of comparator 61 and the output signal of OR gate 41. An AND gate 72 AND-operates the output signal of comparator 61 and the output signal of OR gate 42. An OR gate 80 OR-operates the output signals of AND gates 70, 71 and 72.

Figure 5:
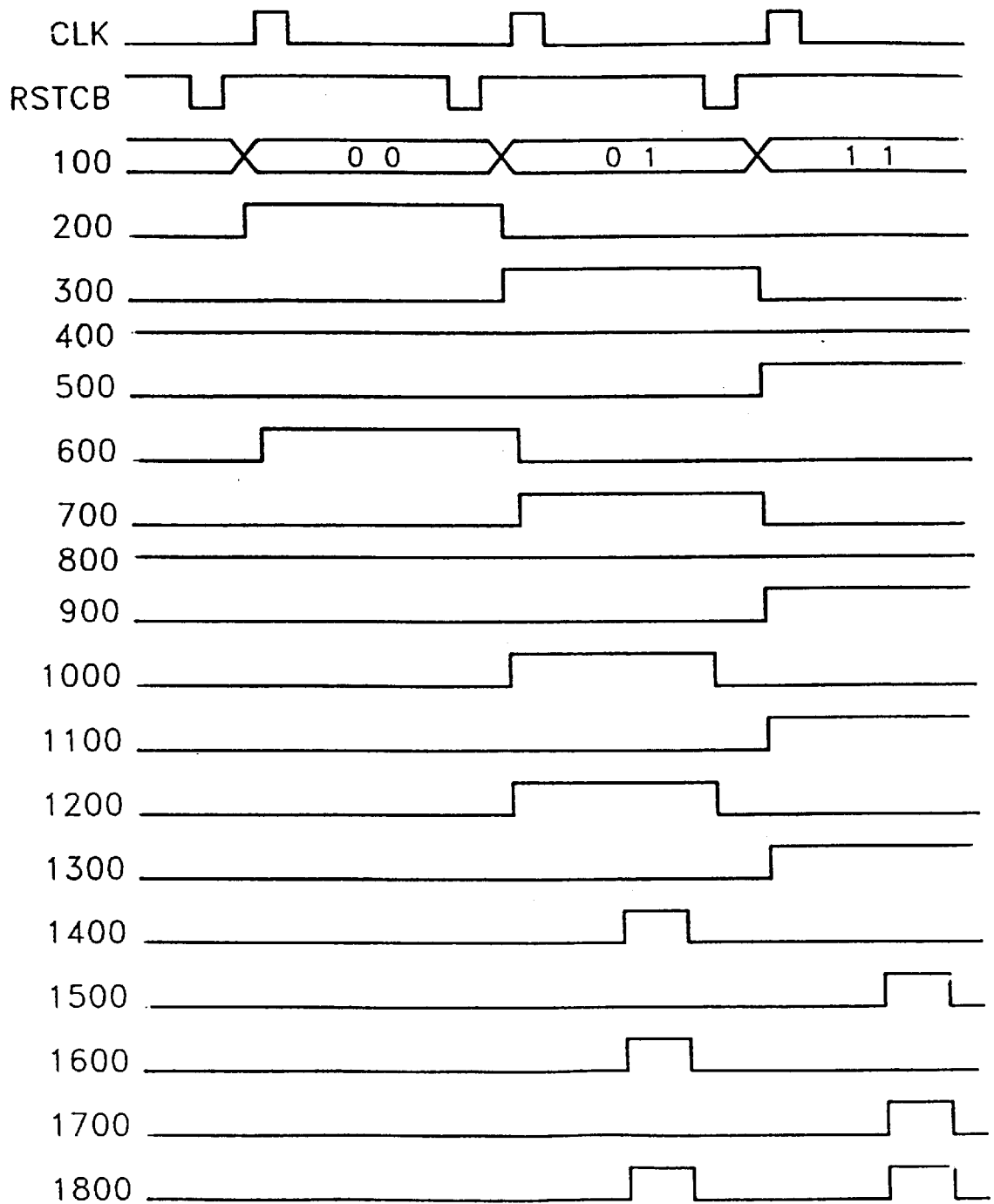
FIG. 5 is a timing diagram for explaining the operation of the circuit shown in FIGS. 4A and 4B.

Referring to FIG. 5 which is a timing diagram for the operation of the circuit shown in FIGS. 4A and 4B, decoder 10 receives and decodes signals 100 for selecting a disk recording surface. If "00" is input to select first disk recording surface HD0, signal 200 becomes high. Latch 20 latches signal 200 to generate signal 600.

After that, if "00" is input as signal 100 to select head HD1, decoder 10 receives and decodes "01" and then outputs signal 300. Being synchronous with signal 300, latch 31 outputs signal 1000 after receiving output signal from latch 20. If "11" is input as signal 100 to switch selected head HD1 to head HD3, decoder 10 receives and decodes "11" and then outputs signal 500. Being synchronous with signal 500, latch 33 outputs signal 1100 after receiving output signal from latch 20.

If a value (that is, a skew value) designated by latch 50 and the value counted from the start point of a preamble match, comparator 60 generates signal 1400. If a value designated by latch 51 and the value counted from the start point of a preamble match, comparator 61 generates signal 1500. AND gate 70 receives signal 1400 to generate signal 1600. AND gate 71 receives signal 1500 to generate signal 1700. OR gate 80 OR-operates signals 1600 and 1700 to generate signal 1800.

Accordingly, in the head-switching method and circuit for reading out data written on a medium according to the staggered servo method of the present invention, a skew value of each sector identification code can be compensated for during head-switching to precisely find the start point of a sector.

The present invention can be employed in systems for reading data recorded on a medium according to a staggered servo mechanism, for instance, hard disk drives.

What is claimed is:

1. A head-switching circuit for switching a head operation among four recording surfaces to permit read out of data recorded from respective recording surfaces according to a staggered servo mechanism, said circuit comprising:

selecting means receiving input signals for selecting one of said recording surfaces as a selected recording surface;

latching means for latching a select signal generated by said selecting means and producing first through fourth output signals;

classifying means for classifying the select signal latched by said latching means according to a skew time between a current selected recording surface and the selected recording surface, taking the select signal output by said selecting means as an enable signal;

a comparing and sync signal generating means for comparing a count signal counted from a start point of respective sectors of each recording surface and a signal corresponding to the respective skew time of each recording surface, and for generating a sync signal when said count signal and respective skew time for one of said recording surfaces match, wherein said latching means outputs first through fourth output signals comprising the select signal and wherein said classifying means comprises:

first classifying means for latching said fourth, said third and said second output signals of said latching means;

second classifying means for latching said first, said fourth and said third output signals of said latching means;

third classifying means for latching said second, said first and said fourth output signals of said latching means; and fourth classifying means for latching said third, said second and said first output signals of said latching means.

2. The head-switching circuit as claimed in claim 1, wherein said comparing and sync signal generating means comprises:
- first OR-operating means for OR-operating on respective first output signals of said first through fourth classifying means;
- second OR-operating means for OR-operating on respective second output signals of said first through fourth classifying means;
- third OR-operating means for OR-operating on respective third output signals of said first through fourth classifying means;
- first latching means for latching a first count signal;
- second latching means for latching a second count signal;
- third latching means for latching a third count signal;
- first comparing means for comparing a period counted from the start point of the sector and first count signal of said first latching means;
- second comparing means for comparing said period counted from the start point of the sector and said second count signal of said second latching means;
- third comparing means for comparing said period counted from the start point of the sector and said third count signal of said third latching means;
- first AND-operating means for AND-operating on respective output signals of said first OR-operating means and said first comparing means;
- second AND-operating means for AND-operating on respective output signals of said second OR-operating means and said second comparing means;
- third AND-operating means for AND-operating on respective output signals of said third OR-operating means and said third comparing means; and
- generating means OR-operating on respective output signals of said first, said second and said third AND-operating means thereby generating said sync signal.

* * * * *